Patented Nov. 8, 1938

2,135,709

UNITED STATES PATENT OFFICE 2,135,709

ACETIC-PYRUVIC ANHYDRIDE

George De Witt Graves, Wilmington, Del., assignor to E. I. du Pont de Nemours & Company, Wilmington, Del., a corporation of Delaware No Drawing. Application December 19, 1933,
Serial No. 703,072

2 Claims. (Cl. 260—546)

This invention relates to the preparation of acid anhydrides and more particularly to the preparation of mixed acid anhydrides of organic carboxylic acids through the reaction of ketene with an organic carboxylic acid other than acetic acid.

Ketene may be prepared by various methods such as the reaction of zinc on bromoacetyl bromide or by the pyrolysis of various substances such as acetone, acetic anhydride and the like. The most economical method for the preparation is by the pyrolysis of acetone.

This invention has as an object the preparation of mixed acid anhydrides in which one of the acid radicals is that of acetic acid. A further object of this invention is the new products which may be prepared by this process. Further objects will appear hereinafter.

These objects are accomplished by the following invention wherein ketene is reacted with an organic carboxylic acid other than acetic acid. The ketene may or may not be admixed with other gases or vapors and the organic carboxylic acid may be in the pure liquid state or dissolved in a suitable inert solvent or diluent. A trace of sulfuric acid may but need not be used as a catalyst. In general, aliphatic, aromatic heterocyclic and alicyclic mono and polybasic carboxylic acids may be used.

Ketene is generally prepared by the pyrolysis of acetone. As acetone is passed through a heated tube a portion is converted to ketene and methane, the reaction products ordinarily being cooled to condense all possible unchanged acetone. The resulting vaporization mixture of ketene, ethane, small amounts of acetone, and small amounts of ethylene and carbon-monoxide, may then be passed into any substance with which the ketene reacts.

In the present invention the ketene is reacted with an organic carboxylic acid. Thus if, for example, 1 mol. of butyric acid is treated with ketene until 1 mol. of ketene has been absorbed the resulting product is practically pure acetobutyric anhydride formed according to the reaction:

$$CH_2=C=O + C_3H_7COOH = CH_3CO.O.OCC_3H_7$$

The reaction is exothermic so that it is desirable to cool during the absorption of ketene to prevent loss of material by volatilization in the presence of the comparatively large amount of inert gas which passes through the reaction mixture. A further need for cooling results from the relative instability of mixed acid anhydrides at high temperatures. Under high temperature conditions mixed acid anhydrides are in general converted into two simple anhydrides involving the acid radicals present. Distillation of acetobutyric anhydride thus results in a practically quantitative yield of acetic anhydride and butyric anhydride.

In the case of dibasic acids the reaction product may be of a very complex nature involving not only compounds made up of 1 mol. of ketene with 1 mol. of dibasic acid but also compounds involving 2 mols. of ketene with 1 mol. of dibasic acid or higher molecular weight anhydrides involving several mols. of the dibasic acid held together through anhydride linkages.

The following examples are indicative of the invention but are not to be taken in any way as limitative.

Example 1—Acetoformic anhydride

Ketene-containing gases from the pyrolysis of acetone were passed into 101.5 grams of 99% formic acid until the gain in weight was 90 grams. The product was acetoformic anhydride.

Example 2—Acetobutyric anhydride

Ketene-containing gases were passed into 64 grams of absolute butyric acid. After 45 minutes the calculated amount of ketene had been absorbed. The product was acetobutyric anhydride. The acetobutyric acid anhydride may be converted into a mixture of acetic anhydride and butyric anhydride by fractionation through an efficient column, two fractions being obtained. The first fraction, almost all of which boils at the boiling point of acetic anhydride, amounted to 40 grams (0.39 mol.) when 110 grams of the mixed anhydride was used. The second fraction boiling almost entirely at 198°, the boiling point of butyric anhydride, weighed 67 grams (0.43 mol.).

Example 3—An anhydride with adipic acid

Ketene-containing gases were passed into a suspension of 73 grams of adipic acid in 200 grams of toluene. After one hour all of the crystals had dissolved. The temperature was held at 80–85°. After the toluene was evaporated off, the residue was a complex anhydride mixture. The reaction of ketene with adipic acid may also take place at temperatures below the boiling point of acetone thus at 40 or 50° C. When operating in this manner, a more complete recovery of acetone is effected.

Example 4—Acetopyruvic anhydride

Ketene-containing gases were passed into 352 grams of pyruvic acid, held at a temperature of 88–90°. The product was a dark brown liquid.

In this case also acetopyruvic anhydride may be prepared by passing ketene-containing gases into a mixture of pyruvic acid and benzol at 40–50° C.

The examples have described the acetylation of formic, butyric and pyruvic acids. Chlorobutyric, ethoxyacetic acetyllactic, d-ethoxy propionic and other substituted aliphatic acids, stearic, oleic and lauric and other long chain fatty acids, nitrobenzoic, 4-bromophthalic, cinnamic, phenoxycinnamic, phthalic, phenoxyacetic, bromotoluic, p-acetylbenzoic, nitronaphthoic, chlorobenzoic, fluorobenzoic, toluic and naphthoic, and other aromatic acids, hexahydrobenzoic hexahydrophenylene-diacetic and other alicyclic acids, furoic, picolinic, nicotinic, quinolinic and other heterocyclic acids may be used.

Thus there may be used organic carboxylic acids of the formula, RCOOH wherein R is a hydrocarbon radical or a hydrocarbon radical substituted by a carbonyl oxygen, a carboxyl, aryloxy, alkoxy group, acyloxy, a nitrogroup, and a halogen atom. The carboxyl group may be substituted, thus the monomethyl, ethyl, menthyl, phenyl, or cyclohexyl ester of phthalic or iodophthalic acid may be acetylated.

It is preferred to operate at low temperatures rather than at temperatures at or above the boiling point of the carboxylic acid to be acetylated. Since 1 mol. of methane is present for each mol. of ketene it is difficult at best to prevent loss of volatile liquids such as acetone through the volatilizing effect of this gas which of course passes unchanged through the absorption system. Recovery of undecomposed acetone is a vital consideration in the economics of this process. In the preferred form of the present invention this acetone is largely scrubbed out by the relatively cold reaction product produced by the ketene so that little or no acetone needs to be recovered from the methane after the absorption system.

A further advantage of the process of the present invention lies in the retention of the mixed anhydrides as such by forming and maintaining them at relatively low temperatures. The effect of higher temperatures is shown in Example 2.

Hitherto mixed organic acid anhydrides have been made by treating the organic acid with acetic anhydride or with acetyl chloride and pyridine or by the treatment of acyl chlorides with an alkali salt of an organic acid. These methods are expensive and in general impractical on a commercial scale. In addition the desired product must always be purified from other reaction products when the older methods are employed. This is difficult in view of the stability of mixed anhydrides on distillation. When ketene reacts with the pure acid the only product is the desired anhydride. The mixed anhydrides of the present invention are of particular advantage in making mixed esters for example of cellulose or other polyhydric compounds. These mixed anhydrides have somewhat different reactivities from that of a mixture of the two simple anhydrides and therefore in not a few situations represent definite improvement over the mixture of the simple anhydrides. Because of this the preparation of these compounds at temperatures substantially below 100° C. where there is but little possibility of disproportionation of the mixed anhydride to simple anhydride is preferred.

As many apparently widely different embodiments of this invention may be made without departing from the spirit and scope thereof, it is to be understood that I do not limit myself to the specific embodiments thereof except as defined in the appended claims.

I claim:
1. Acetic pyruvic anhydride.
2. Process for the preparation of mixed anhydrides comprising reacting ketene with pyruvic acid.

GEORGE DE WITT GRAVES.